United States Patent
Nakagawa et al.

(10) Patent No.: US 10,059,896 B2
(45) Date of Patent: Aug. 28, 2018

(54) INACTIVATION TREATMENT APPARATUS

(71) Applicant: MITSUBISHI HEAVY INDUSTRIES, LTD., Tokyo (JP)

(72) Inventors: Keiichi Nakagawa, Tokyo (JP); Setsuo Omoto, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 0 days.

(21) Appl. No.: 15/117,961

(22) PCT Filed: Nov. 17, 2014

(86) PCT No.: PCT/JP2014/080298
§ 371 (c)(1),
(2) Date: Aug. 10, 2016

(87) PCT Pub. No.: WO2015/122068
PCT Pub. Date: Aug. 20, 2015

(65) Prior Publication Data
US 2016/0355744 A1 Dec. 8, 2016

(30) Foreign Application Priority Data
Feb. 17, 2014 (JP) .................. 2014-027310

(51) Int. Cl.
*C10L 5/04* (2006.01)
*C10L 9/06* (2006.01)
*C10L 5/44* (2006.01)

(52) U.S. Cl.
CPC ............... *C10L 5/04* (2013.01); *C10L 5/447* (2013.01); *C10L 9/06* (2013.01); *C10L 2290/06* (2013.01); *Y02E 50/10* (2013.01); *Y02E 50/30* (2013.01)

(58) Field of Classification Search
CPC combination set(s) only.
See application file for complete search history.

(56) References Cited

U.S. PATENT DOCUMENTS

| | | | |
|---|---|---|---|
| 5,711,769 | A | 1/1998 | Rinker et al. |
| 5,840,651 | A | 11/1998 | Hanashita et al. |
| 6,436,158 | B1 | 8/2002 | Fujikawa et al. |

FOREIGN PATENT DOCUMENTS

| | | |
|---|---|---|
| JP | 9-71791 A | 3/1997 |
| JP | 11-310785 A | 11/1999 |

(Continued)

OTHER PUBLICATIONS

International Search Report and Written Opinion dated Feb. 17, 2015, issued in counterpart International Application No. PCT/JP2014/080298, with English translation. (13 pages).

*Primary Examiner* — Ellen McAvoy
*Assistant Examiner* — Chantel Graham
(74) *Attorney, Agent, or Firm* — Westerman, Hattori, Daniels & Adrian, LLP

(57) ABSTRACT

An inactivation treatment apparatus includes a rotary kiln main body in which coal flows from an end side toward a tip side; a cooling tube arranged rotatably in conjunction with the rotary kiln main body and extends in the direction of the length of the rotary kiln main body, and in which cooling water can flow; and a treatment gas supply tube arranged rotatably in conjunction with the rotary kiln main body, and extends in the direction of the length of the rotary kiln main body, and can supply a treatment gas into the rotary kiln main body. In the apparatus, each of the cooling tube and the treatment gas supply tube is arranged to move past through a coal layer, which is a layer formed as the result of the sedimentation of the coal, in the rotary kiln main body when the rotary kiln main body rotates.

7 Claims, 4 Drawing Sheets

(56) References Cited

FOREIGN PATENT DOCUMENTS

| | | |
|---|---|---|
| JP | 2007-237011 A | 9/2007 |
| JP | 2013-139536 A | 7/2013 |
| JP | 2014-169375 A | 9/2014 |
| WO | 95/13868 A1 | 5/1995 |
| WO | 2013/103096 A1 | 7/2013 |
| WO | 2014/136479 A1 | 9/2014 | ial # INACTIVATION TREATMENT APPARATUS

TECHNICAL FIELD

The present invention relates to an inactivation treatment apparatus.

BACKGROUND ART

Low-grade coal (low-quality coal) such as brown coal and subbituminous coal with high moisture content has a low calorific value per unit weight. Accordingly, the low-grade coal is dried and pyrolyzed by being heated, and is also upgraded in a low-oxygen atmosphere so as to reduce its oxidation reactivity, thereby being transformed into upgraded coal with an improved calorific value per unit weight while being prevented from being spontaneously ignited.

PRIOR ART DOCUMENTS

Patent Documents

Patent Document 1: Japanese Patent Application Publication No. 2007-237011
Patent Document 2: International Publication No. WO1995/13868 Pamphlet

SUMMARY OF THE INVENTION

Problems to be Solved by the Invention

Various coal inactivation treatment apparatuses to inactivate the above-described pyrolyzed coal produced by subjecting the low-grade coal to drying and pyrolyzing are under consideration. As shown in FIG. 6, for example, there is an apparatus configured to inactivate coal during a process of packing coal into a packed bed column from an upper side thereof and then taking the coal out from a lower side thereof, by introducing a gas with an adjusted oxygen concentration in the middle of a packed bed to bring the gas into contact with the coal and subsequently taking the gas out, thereby causing the coal to adsorb oxygen in the gas. Such an apparatus 700 includes a treatment column 701 which passes coal 721 being the above-mentioned pyrolyzed coal to the inside from an upper part being one side toward a lower part being the other side. Distal end sides of introduction tubes 711 to introduce a treatment gas 733 that contains a low concentration of oxygen into the treatment column 701, and base end sides of discharge tubes 712 to discharge a treatment gas 734 having been passed inside the treatment column 701 to the outside, are connected to the treatment column 701 along a vertical direction, respectively. A distal end side of a feed tube 713 to feed the treatment gas 733 is connected to the base end sides of the introduction tubes 711.

A distal end side of an air supply tube 714 that supplies air 731 and a distal end side of a nitrogen supply tube 715 that supplies nitrogen gas 732 are connected to a base end side of the feed tube 713. A base end side of the nitrogen supply tube 715 is connected to a nitrogen supply source 716 such as a nitrogen gas tank. A base end side of the air supply tube 714 is opened to the atmosphere. Flow rate adjustment valves 714a and 715a are provided in the middle of the air supply tube 714 and the nitrogen supply tube 715, respectively. A blower 713a is provided in the middle of the feed tube 713. A moisture-temperature adjustment device 713b configured to adjust temperature and moisture of the treatment gas 733 is provided between the distal end side of the feed tube 713 and the blower 713a. A base end side of a branched tube 718 to discharge the treatment gas 733 to the outside of the system is connected to a portion between the blower 713a and the moisture-temperature adjustment device 713b of the feed tube 713. A base end side of a circulation tube 717 is connected to distal end sides of the discharge tubes 712. A distal end side of the circulation tube 717 is connected to the base end side of the feed tube 713.

In the coal inactivation treatment apparatus 700, the pyrolyzed coal 721 is supplied from the upper part into the treatment column 701. Moreover, the air 731 and the nitrogen gas 732 are fed from the supply tubes 714 and 715 to the feed tube 713 by controlling apertures of the flow rate adjustment valves 714a and 715a and controlling operation of the blower 713a, whereby the air 731 and the nitrogen gas 732 are thus mixed into the treatment gas 733. In addition, the temperature and the moisture of the treatment gas 733 are adjusted by controlling operation of the moisture-temperature adjustment device 713b. The treatment gas 733 with the temperature and the moisture adjusted as described above is introduced into the treatment column 701 through the introduction tubes 711, and after inactivating surfaces of the coal 721 inside the treatment column 701, is discharged as the used treatment gas 734. The used treatment gas 734 discharged to the circulation tube 717 is returned to the feed tube 713 and mixed with new air 731 and new nitrogen gas 732 from the supply tubes 714 and 715, and is used again as a new treatment gas 733. At this time, the treatment gas 733 in the same amount as the air 731 and the nitrogen gas 732 supplied from the supply tubes 714 and 715 is discharged from the branched tube 718 to the outside of the system. While the treatment gas 733 flows inside the treatment column 701, the coal 721 is supplied from the upper part to the inside of the treatment column 701, and oxygen is adsorbed in the course of passage of the coal 721 from the upper part toward the lower part of the treatment column 701. Thus, coal 722 subjected to the inactivation treatment is discharged from the lower part of the treatment column 701.

In the apparatus 700, if rapid oxygen adsorption is performed by increasing the oxygen concentration of the treatment gas 733, the temperature of the coal inside the packed bed rises abruptly and a risk of inducing spontaneous ignition is increased. For this reason, the rise in temperature of the coal is suppressed by performing slow oxygen adsorption. To cause the aforementioned coal to adsorb a predetermined amount of oxygen, it is necessary to set a long detention time (about 14 hours, for example) for the coal inside the packed bed and to increase the height (20 m×2, for example) of the packed bed in association therewith. Such requirements lead to problems of an increase in equipment cost and a slow process response.

Meanwhile, the same problems as those of the coal inactivation treatment apparatus described above are likely to occur in an inactivation treatment apparatus configured to perform an inactivation treatment on carbides such as biomass (wood and waste materials, for example).

In view of the above, the present invention has been made to solve the aforementioned problems and an object thereof is to provide an inactivation treatment apparatus, which is capable of producing an inactivated carbide within a short time while preventing occurrence of spontaneous ignition.

Means for Solving the Problems

An inactivation treatment apparatus according to a first invention for solving the above-mentioned problems is an inactivation treatment apparatus configured to inactivate a carbide by using a treatment gas containing oxygen that comprises: a kiln main body provided rotatably and allowing the carbide to pass inside of the kiln main body from a base end side to a distal end side; a cooling tube provided in such a way as to be rotatable in conjunction with the kiln main body and to extend in a longitudinal direction of the kiln main body, and causing cooling water to flow inside of the cooling tube; and a treatment gas supply tube provided in such a way as to be rotatable in conjunction with the kiln main body and to extend in the longitudinal direction of the kiln main body, and configured to supply the treatment gas into the kiln main body, wherein the cooling tube and the treatment gas supply tube are disposed in such a way as to run through a carbide layer formed by depositing the carbide inside the kiln main body when the kiln main body is rotated.

An inactivation treatment apparatus according to a second invention for solving the above-mentioned problems is an inactivation treatment apparatus according to the above-mentioned first invention, wherein the treatment gas supply tube is disposed adjacent to the cooling tube, and the treatment gas supply tube includes a nozzle hole configured to supply the treatment gas into the kiln main body.

An inactivation treatment apparatus according to a third invention for solving the above-mentioned problems is an inactivation treatment apparatus according to the above-mentioned second invention, wherein the nozzle hole is disposed opposite to the cooling tube, and the treatment gas supply tube includes guiding means for guiding a direction of supply of the treatment gas into the kiln main body.

An inactivation treatment apparatus according to a fourth invention for solving the above-mentioned problems is an inactivation treatment apparatus according to the above-mentioned third invention, wherein the guiding means is provided such that the direction of supply of the treatment gas is set in a range from 0 degrees to 90 degrees inclusive with respect to a line in a radial direction running through a center axis of the kiln main body in terms of a reverse rotational direction of the kiln main body.

An inactivation treatment apparatus according to a fifth invention for solving the above-mentioned problems is an inactivation treatment apparatus according to any one of the above-mentioned second to fourth inventions, wherein the cooling tubes are disposed on multiple layers in a radial direction of the kiln main body, and the treatment gas supply tube is provided to the cooling tube disposed on the outermost layer.

An inactivation treatment apparatus according to a sixth invention for solving the above-mentioned problems is an inactivation treatment apparatus according to any one of the above-mentioned first to fifth inventions, wherein a supply flow velocity of the treatment gas into the kiln main body is adjusted in a range from 0.05 m/sec to 3 m/sec.

An inactivation treatment apparatus according to a seventh invention for solving the above-mentioned problems is an inactivation treatment apparatus according to any one of the above-mentioned first to sixth inventions, wherein an amount of supply of the treatment gas into the kiln main body is adjusted equal to or above 0.025 (NL-$O_2$/min/kg—the carbide).

An inactivation treatment apparatus according to an eighth invention for solving the above-mentioned problems is an inactivation treatment apparatus according to any one of the above-mentioned second to seventh inventions, wherein the nozzle hole is provided on the distal end side of the kiln main body and provided in a region equal to or above 5% of a total length of the kiln main body.

An inactivation treatment apparatus according to a ninth invention for solving the above-mentioned problems is an inactivation treatment apparatus according to any one of the above-mentioned first to eighth inventions, wherein the carbide is coal.

Effect of the Invention

According to the inactivation treatment apparatus of the present invention, the cooling tube and the treatment gas supply tube are disposed in such a way as to run through the carbide layer when the kiln main body is rotated, in which the carbide layer is formed by depositing the carbide inside the kiln main body. Thus, even if a rapid inactivation treatment (an oxidation treatment) is performed, it is possible to suppress ignition of the carbide as compared to the case of a conventional inactivation treatment apparatus. For this reason, when the inactivation treatment apparatus is designed to have the same treatment capacity as that of the conventional inactivation treatment apparatus, the inactivation treatment apparatus can be made smaller in size than the conventional inactivation treatment apparatus, so that detention time of the carbide inside the apparatus can be reduced. Moreover, since it is possible to efficiently perform the inactivation treatment on the carbide, i.e., adsorption of oxygen onto a surface of the carbide, while preventing spontaneous ignition of the carbide. As a consequence, a process response can be improved as compared to the treatment with the conventional inactivation treatment apparatus.

MODES FOR CARRYING OUT THE INVENTION

An embodiment of an inactivation treatment apparatus according to the present invention will be described on the basis of the drawings. It is to be noted, however, that the present invention is not limited only to the following embodiments to be described on the basis of the drawings.

An embodiment of the inactivation treatment apparatus according to the present invention will be described on the basis of FIG. 1 to FIG. 3. This embodiment describes a case of inactivating coal which is a carbide.

Figure 1:
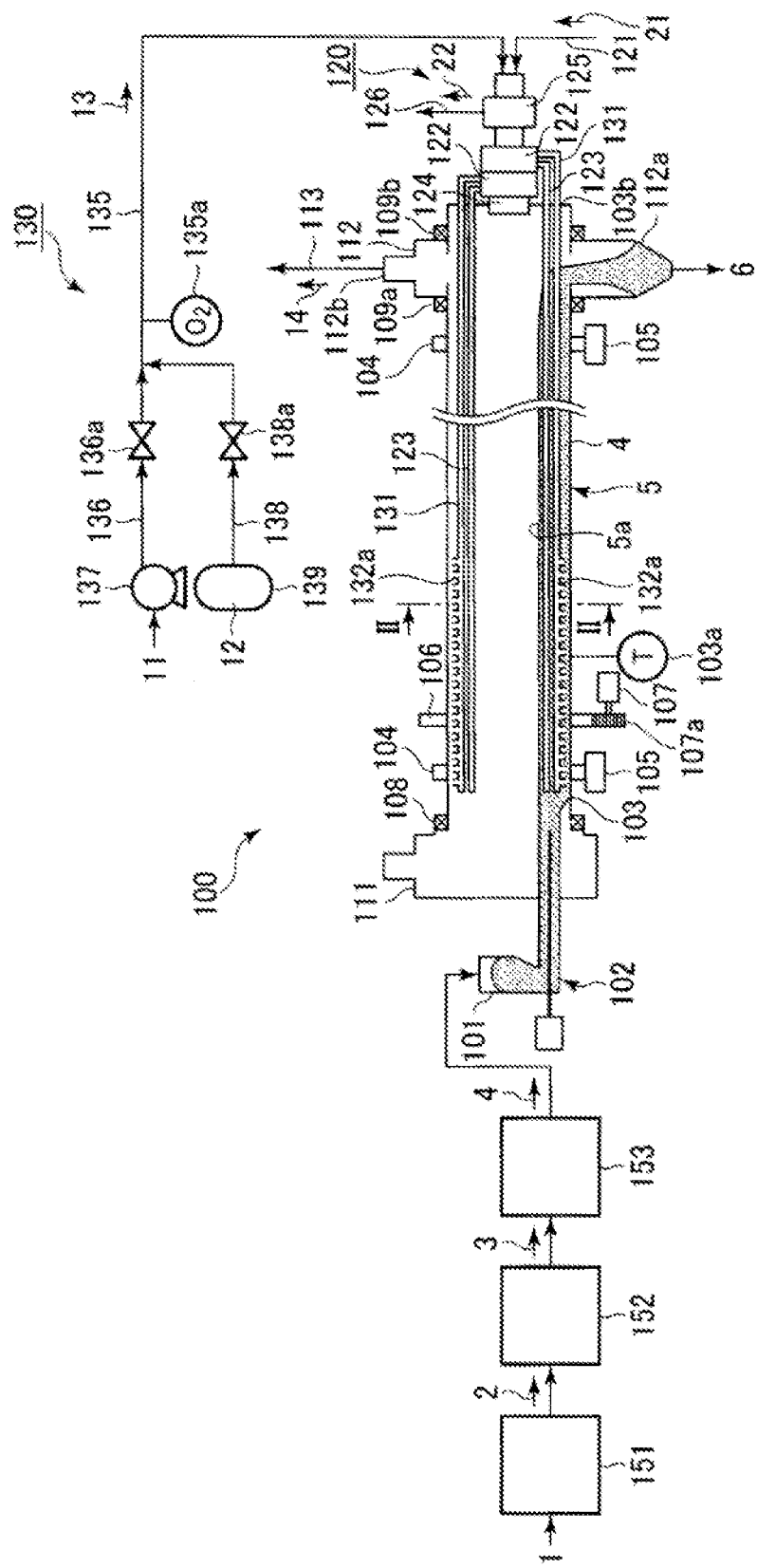
FIG. 1 is a schematic configuration diagram of an embodiment of an inactivation treatment apparatus according to the present invention.

As shown in FIG. 1, low-grade coal (low-quality coal) 1 such as brown coal and subbituminous coal with high moisture content is supplied to an inlet of a dryer 151, which is drying means of a mesh conveyor type for passing a hot wind (150° C. to 500° C.) to the inside. An outlet of the dryer 151 is connected to an inlet of a pyrolyzer 152, which is pyrolyzing means of a continuous type capable of heating the inside to a high temperature (300° C. to 500° C.). An outlet of the pyrolyzer 152 is connected to an inlet of a cooler 153, which is cooling means capable of cooling the inside to a low temperature (150° C. to 200° C.). An outlet of the cooler 153 is connected to an inlet of a hopper 101 of such an inactivation treatment apparatus 100. An outlet of the hopper 101 is connected to a base end side of a screw feeder 102, which is conveying means of a rotary type for performing rotation and conveyance toward its distal end side.

The distal end side of the screw feeder 102 is connected to a base end side of a cylindrical rotary kiln main body (a kiln main body) 103. The base end side of the rotary kiln main body 103 is connected to a base end side casing 111 through a sealing device 108.

A distal end side of the rotary kiln main body 103 is connected to a distal end side casing 112 through sealing devices 109a and 109b. A chute 112a used for dropping and discharging coal (upgraded coal) 6 subjected to an inactivation treatment is provided below the distal end side casing 112. A gas discharge outlet 112b for discharging a used treatment gas 14 is provided to an upper part of the distal end side casing 112. The gas discharge outlet 112b is connected to a base end side of a treatment gas discharge tube 113 that discharges the used treatment gas 14 to the outside of the system.

Annular protrusions 104 are provided on a distal end side and a base end side of an outer peripheral portion of the rotary kiln main body 103. The protrusions 104 are supported by rollers 105. A gear 106 which meshes with a gear 107a of a driving motor 107 is provided on the outer peripheral portion of the rotary kiln main body 103. Accordingly, the rotary kiln main body 103 is rotated along with rotation of the gear 107a of the driving motor 107. A rotation speed of the rotary kiln main body 103 is preferably adjusted in a range from 15 rpm to 20 rpm, for example.

The above-described inactivation treatment apparatus 100 includes a coal cooling device 120, with which the coal 4 supplied into the rotary kiln main body 103 is indirectly cooled by using cooling water 21. The coal cooling device 120 includes a cooling water feed tube 121, a triple fluid feed header 122, multiple (such as fourteen (see FIG. 2)) cooling tubes 123 (each being a double tube, for example), a bearing 124, a cooling water discharge header 125, and a cooling water discharge tube 126.

A pump (not shown) to feed the cooling water 21, a tank (not shown) to store the cooling water, and the like are provided on a base end side of the cooling water feed tube 121. A distal end side of the cooling water feed tube 121 is connected to the triple fluid feed header 122. The triple fluid feed header 122 is provided to the bearing 124, which is fixed to a side wall portion 103b on the distal end side of the rotary kiln main body 103. Base end sides of the multiple cooling tubes 123 are connected to the triple fluid feed header 122, and the cooling water discharge header 125 is also connected thereto. A base end side of the cooling water discharge tube 126, which is configured to discharge used cooling water 22 to be described later in detail to the outside of the system, is connected to the cooling water discharge header 125.

The multiple cooling tubes 123 are disposed penetrating the side wall portion 103b of the rotary kiln main body 103. As shown in FIG. 1 and FIG. 2, the multiple cooling tubes 123 are disposed so as not to cause the coal 4 to bridge between the adjacent cooling tubes 123 and 123 inside the rotary kiln main body 103. Meanwhile, the multiple cooling tubes 123 are disposed adjacent to one another at regular intervals in a circumferential direction of the rotary kiln main body 103.

In addition, the multiple cooling tubes 123 are disposed at such positions that, at the time of rotation of the rotary kiln main body 103, the multiple cooling tubes 123 run through a coal layer 5 formed by depositing the coal 4 even if a filling rate of the coal 4 in the rotary kiln main body 103 is in a range from 20% to 30%, for example, and are also disposed such that distances D1 of center axes C2 of the cooling tubes 123 from a center axis C1 of the rotary kiln main body 103 are equal to one another. Inside the rotary kiln main body 103, the multiple cooling tubes 123 extend parallel to the center axis C1 of the rotary kiln main body 103 across from the distal end side to the base end side of the rotary kiln main body 103. The multiple cooling tubes 123 are supported by support tools (not shown) disposed at multiple positions in a longitudinal direction thereof.

Thus, along with the rotation of the rotary kiln main body 103, the multiple cooling tubes 123 are rotated about the center axis C1 of the rotary kiln main body 103 and in conjunction with the rotary kiln main body 103. Accordingly, in a region where the coal 4 is subjected to the inactivation treatment by a treatment gas 13 to be described later in detail which is supplied into the rotary kiln main body 103, the coal 4 is adjusted, by the cooling water 21 flowing in the multiple cooling tubes 123, to such a temperature that does not cause spontaneous ignition.

When the cooling water 21 at 30° C., for example, is supplied to the cooling water feed tube 121, the cooling water 21 flows in the multiple cooling tubes 123 through the triple fluid feed header 122, and is thus used for adjusting the temperature of the coal 4 inside the rotary kiln main body 103. Thereafter, the cooling water at about 38° C., for example, is discharged to the outside of the system through the cooling water discharge header 125 and the cooling water discharge tube 126.

The above-described inactivation treatment apparatus 100 further includes a treatment gas supply device 130, which supplies the treatment gas 13 into the coal layer 5 formed by depositing the coal 4 inside the rotary kiln main body 103. The treatment gas supply device 130 includes treatment gas supply tubes 131, guide mechanisms 132, the triple fluid feed header 122, a treatment gas feed tube 135, an air supply tube 136, a blower 137, an inert gas supply tube 138, an inert gas supply source 139, and the like.

A distal end side of the treatment gas feed tube 135 is connected to the triple fluid feed header 122. A distal end side of the air supply tube 136 and a distal end side of the inert gas supply tube 138 are connected to a base end side of the treatment gas feed tube 135. A base end side of the air supply tube 136 is connected to a gas ejection port of the blower 137. Flow rate adjustment valves 136a and 138a are provided in the middle of the air supply tube 136 and the inert gas supply tube 138, respectively. A base end side of the inert gas supply tube 138 is connected to the inert gas supply source 139. For example, a tank to store an inert gas 12 such as nitrogen gas can be used as the inert gas supply source 139. Accordingly, by controlling apertures of the flow rate adjustment valves 136a and 138a and controlling operation of the blower 137, a treatment gas 13 formed by mixing the air 11 and the inert gas 12, which are fed from the supply tubes 136 and 138 to the feed tube 135, is passed to the triple fluid feed header 122.

Meanwhile, base end sides of the multiple treatment gas supply tubes 131 are connected to the triple fluid feed header 122. The multiple treatment gas supply tubes 131 are disposed penetrating the side wall portion 103b of the rotary kiln main body 103. The multiple treatment gas supply tubes 131 are disposed adjacent to the cooling tubes 123, respectively. Thus, as with the multiple cooling tubes 123, the multiple treatment gas supply tubes 131 are disposed at such positions that, at the time of rotation of the rotary kiln main body 103, the multiple treatment gas supply tubes 131 run through the coal layer 5 formed by depositing the coal 4 even if the filling rate of the coal 4 in the rotary kiln main body 103 is in the range from 20% to 30%, for example.

Figure 3:
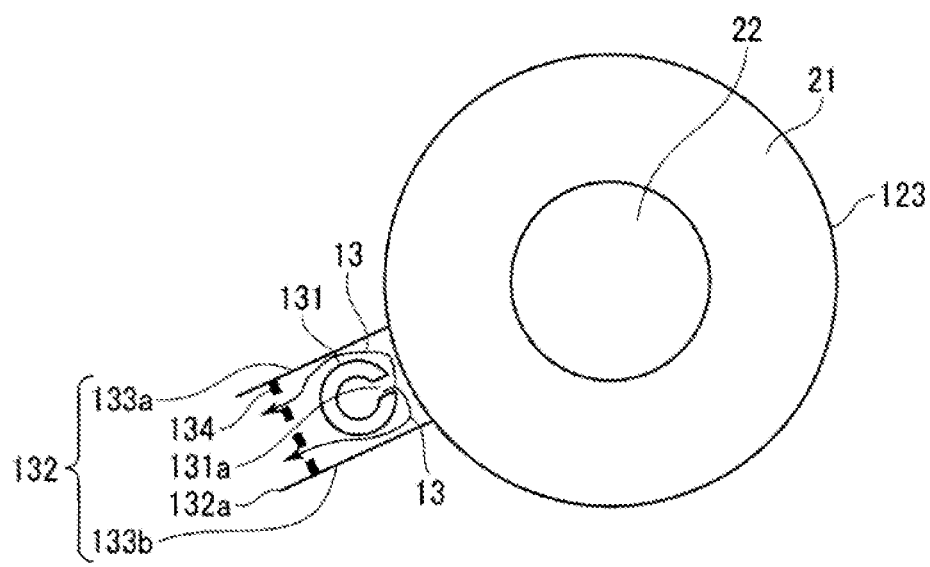
FIG. 3 is an enlarged diagram of a treatment gas injection structure with a treatment gas feed tube provided to the inactivation treatment apparatus.

As shown in FIG. 1 and FIG. 3, multiple holes (nozzle holes) 131a from which the treatment gas 13 can be ejected are provided at positions on the distal end side of each of the multiple treatment gas supply tubes 131, the positions being opposite to the corresponding cooling tube 123. The multiple holes 131a are preferably provided in a region equal to or above 5% and equal to or below 50% of the total length of each treatment gas supply tube 131 due to the following reasons. Specifically, if the range of provision of the multiple holes 131a is below 5%, it is not possible to sufficiently subject the coal 4 to the inactivation treatment due to a small amount of oxygen to be adsorbed on the coal 4. On the other hand, if the range of provision of the multiple holes 131a is above 50%, it is not possible to sufficiently supply the treatment gas 13 to the distal end side of the treatment gas supply tube 131.

The multiple treatment gas supply tubes 131 are provided with the guide mechanisms 132, respectively. Each guide mechanism (guiding means) 132 is disposed adjacent to the corresponding treatment gas supply tube 131, and includes two guide plates 133a and 133b fixed to the corresponding cooling tube 123, and a current plate 134 fixed to the guide plate 133a and the guide plate 133b. Thus, the treatment gas 13 having flowed through the treatment gas supply tube 131 is discharged from the holes 131a of the treatment gas supply tube 131, then guided by the cooling tube 123 and the guide mechanism 132, and ejected from a gas ejection unit 132a, which is formed of the guide plates 133a and 133b, to the coal 4.

Figure 2:
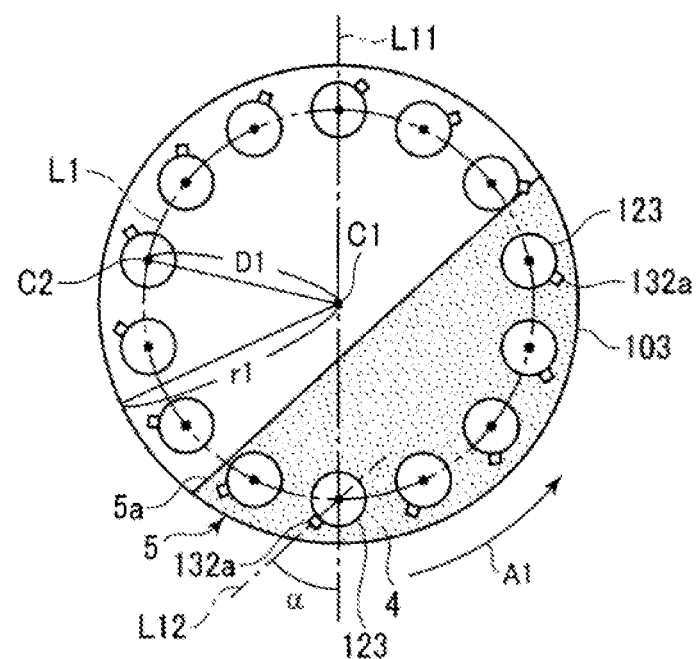
FIG. 2 is an enlarged cross-sectional view taken and viewed along arrows II-II in FIG. 1.

Here, the guide mechanism 132 is preferably provided in such a way that, as shown in FIG. 2, a direction of ejection of the treatment gas 13 by the guide mechanism 132 forms a predetermined angle α with respect to a line L11 in a radial direction that runs through the center axis C1 of the rotary kiln main body 103, in terms of an opposite direction to a rotational direction A1 of the rotary kiln main body 103, i.e., a reverse rotational direction of the rotary kiln main body 103. The predetermined angle α is set in a range from 0 degrees to 90 degrees, for example, due to the following reason. Specifically, if the angle α is below 0 degrees or above 90 degrees, the coal 4 may go into the guide mechanism 132.

A supply flow velocity of the treatment gas 13 to the coal layer 5 is adjusted preferably in a range from 0.05 m/sec to 3 m/sec, for example, or more preferably in a range from 0.1 m/sec to 1 m/sec due to the following reasons. Specifically, if the supply flow velocity of the treatment gas 13 is below 0.05 m/sec, when the treatment gas supply tube 131 goes out of the coal layer 5 the gas ejection unit 132a is directed upward, whereby coal dust (pyrolysis coal) flowing in a gas phase of the rotary kiln main body 103 may go into the guide mechanism 132. On the other hand, if the supply flow velocity of the treatment gas 13 is above 3 m/sec, the treatment gas 13 supplied into the rotary kiln main body 103 flows in a wall surface direction of the rotary kiln main body 103 due to an inertial force, and the treatment gas 13 runs through the rotary kiln main body 103 without being sufficiently passed into the coal layer 5.

An amount of supply of the treatment gas 13 into the rotary kiln main body 103 is adjusted preferably equal to or above 0.025 (NL-$O_2$/min/kg—the coal 4), for example, or more preferably equal to or above 0.1 (NL-$O_2$/min/kg—the coal 4) due to the following reason. Specifically, if the amount of supply of the treatment gas 13 into the rotary kiln main body 103 is below 0.025 NL-$O_2$/min/kg—the treated coal, it is not possible to supply sufficient oxygen into the coal layer 5.

An oxygen concentration in the treatment gas 13 is adjusted preferably equal to or below 13%, for example, due to the following reason. Specifically, if the oxygen concentration in the treatment gas 13 is above 13%, the pyrolysis coal in the coal 4 needs to be handled with care.

Here, it is possible to use the cooling tubes 123, the treatment gas feed tubes 131, and the guide mechanisms 132, that are formed from a material such as steel, which has no reactivity with the coal 4 and has heat resistance.

The rotary kiln main body 103 is provided with a temperature sensor 103a. The treatment gas feed tube 135 is provided with an oxygen sensor 135a.

Next, core operation of the above-mentioned inactivation treatment apparatus 100 will be described.

When the coal 4 at 150° C., for example, is supplied to the hopper 101, the screw feeder 102 conveys the coal 4 into the rotary kiln main body 103. In the meantime, the air 11 and the inert gas (such as nitrogen gas) 12 are supplied to the treatment gas feed tube 135 through the air supply tube 136 and the inert gas supply tube 138, by controlling the operation of the blower 137 while controlling the apertures of the flow rate adjustment valves 136a and 138a. In this way, the air 11 and the inert gas 12 are mixed and formed into the treatment gas 13 (with the oxygen concentration in a range from about 5% to 10%, for example). The treatment gas 13 is supplied into the coal layer 5 formed by depositing the coal 4 inside the rotary kiln main body 103, through the triple fluid feed header 122, the treatment gas supply tubes 131, and the guide mechanisms 132.

As the gear 107a of the driving motor 107 is rotated, the rotation is transmitted through the gear 106 and the rotary kiln main body 103 is rotated as a consequence. Along with the rotation of the rotary kiln main body 103, the coal 4 conveyed into the rotary kiln main body 103 is moved from the base end side to the distal end side of the rotary kiln main body 103 while being stirred. At this time, the coal 4 inside the rotary kiln main body 103 adsorbs oxygen in the treatment gas 13 supplied into the rotary kiln main body 103. As a consequence of the oxygen adsorption as described above, the coal 4 is transformed into coal (upgraded coal) 6 subjected to the inactivation treatment. The coal 6 at about 50° C., for example, is conveyed out of the system through the chute 112a. Although the coal 4 inside the rotary kiln main body 103 generates heat as a consequence of adsorbing oxygen in the treatment gas 13, the cooling water 21 flowing inside the cooling tubes 123 adjusts the coal 4 at such a temperature that does not cause spontaneous ignition thereof.

The used treatment gas (about 50° C. to 70° C.) 14 used for the inactivation treatment of the coal 4 inside the rotary kiln main body 103 flows in the same direction as the direction of conveyance of the coal 4, hence flows from the gas discharge outlet 112b of the distal end side casing 112 provided at the distal end side of the rotary kiln main body 103 to the treatment gas discharge tube 113, and is then discharged to the outside of the system through the treatment gas discharge tube 113.

Here, in the above-described inactivation treatment apparatus 100, the multiple treatment gas supply tubes 131 are provided inside the rotary kiln main body 103 in such a way as to be rotated in conjunction with the rotary kiln main body 103 and about the center axis C1 of the rotary kiln main body 103 along with the rotation of the rotary kiln main body 103, and to run through the coal layer 5 formed by depositing the coal 4 supplied into the rotary kiln main body 103. Moreover, the treatment gas supply tubes 131 are provided with the holes 131a and the guide mechanisms 132 in accordance with the above-mentioned specifications. As a consequence, the following operation further takes place.

Specifically, in this embodiment, the treatment gas 13 ejected from the holes 131a of the multiple treatment gas supply tubes 131 is supplied into the rotary kiln main body 103 while being guided by the cooling tubes 123 and the guide mechanisms 132. Here, the holes 131a are provided only on the distal end sides of the multiple treatment gas supply tubes 131 (such as the region equal to or above 5% and equal to or below 50% of the total length). Moreover, the multiple treatment gas supply tubes 131 provided with the holes 131a are disposed in such a way as to run through the coal layer 5 formed by depositing the coal 4 inside the rotary kiln main body 103. Hence, the treatment gas 13 is brought into contact evenly with the entire coal 4 soon after being conveyed into the rotary kiln main body 103. At this time, the multiple cooling tubes 123 are also disposed in such a way as to run through the coal layer 5 formed by depositing the coal 4 inside the rotary kiln main body 103. Hence, the cooling water 21 flowing in the multiple cooling tubes 123 adjusts the coal 4 at such a temperature that does not cause the spontaneous ignition.

As a consequence, the inactivation treatment apparatus 100 of this embodiment includes: the rotary kiln main body 103 provided rotatably and allowing the coal 4 to pass the inside from the base end side to the distal end side; the cooling tubes 123 provided in such a way as to be rotatable in conjunction with the rotary kiln main body 103 and to extend in the longitudinal direction of the rotary kiln main body 103, and causing the cooling water 21 to flow therein; and the treatment gas supply tubes 131 provided in such a way as to be rotatable in conjunction with the rotary kiln main body 103 and to extend in the longitudinal direction of the rotary kiln main body 103, and configured to supply the treatment gas 13 into the rotary kiln main body 103. Here, the cooling tubes 123 and the treatment gas supply tubes 131 are disposed in such a way as to run through the coal layer 5 when the rotary kiln main body 103 is rotated, the coal layer 5 being formed by depositing the coal 4 inside the rotary kiln main body 103. Thus, even if a rapid inactivation treatment (an oxidation treatment) is performed, it is possible to suppress ignition of the coal 4 as compared to the case of a conventional inactivation treatment apparatus. For this reason, when the inactivation treatment apparatus 100 is designed to have the same treatment capacity as that of the conventional inactivation treatment apparatus, the inactivation treatment apparatus 100 can be made smaller in size than the conventional inactivation treatment apparatus. For example, a treatment which used to involve detention of the coal inside the apparatus for about 7 hours can be performed in a shorter time such as about 1 hour. Moreover, it is possible to efficiently perform the inactivation treatment on the coal 4, i.e., adsorption of oxygen onto surfaces of the coal 4 while preventing spontaneous ignition of the coal 4.

As a consequence, a process response can be improved as compared to the treatment with the conventional inactivation treatment apparatus.

Other Embodiments

Note that although the inactivation treatment apparatus 100 in which the multiple cooling tubes 123, the multiple treatment gas supply tubes 131, and the guide mechanisms 132 are arranged on one layer in the rotary kiln main body 103 has been described above, it is also possible to form an inactivation treatment apparatus in which the multiple cooling tubes 123, the multiple treatment gas supply tubes 131, and the guide mechanisms 132 are arranged on multiple layers in the rotary kiln main body 103.

Figure 4:
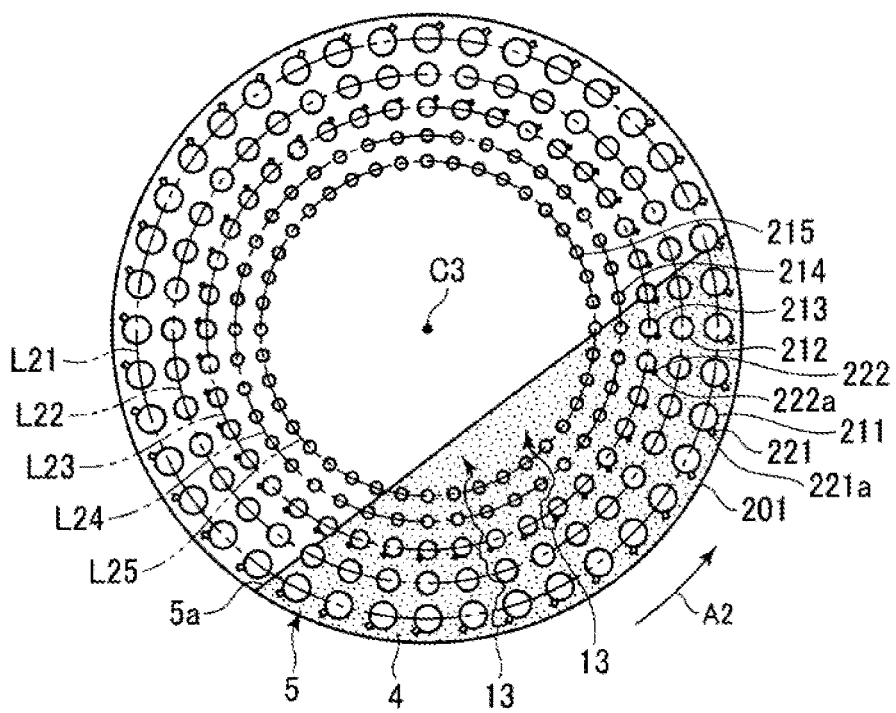
FIG. 4 is a cross-sectional view of a kiln main body provided to another embodiment of an inactivation treatment apparatus according to the present invention.

For example, as shown in FIG. 4, it is also possible to provide an inactivation treatment apparatus including: multiple cooling tubes 211, 212, 213, 214, and 215 on a first layer (the outermost layer), a second layer, a third layer, a fourth layer, and a fifth layer (the innermost layer) to be provided inside a rotary kiln main body 201 and arranged such that distances thereof from a center axis C3 of the rotary kiln main body 201 are L21, L22, L23, L24, and L25, respectively; and treatment gas supply tubes 221 and 222 provided to the multiple cooling tubes 211 and 213 on the first layer and the third layer, respectively, in which the treatment gas supply tubes 221 and 222 are provided with ejection nozzles 221a and 222a, respectively.

Meanwhile, it is also possible to provide an inactivation treatment apparatus including the multiple cooling tubes 123, the multiple treatment gas supply tubes 131, and the guide mechanisms 132 provided on multiple layers inside the rotary kiln main body 103, in which the treatment gas supply tubes 131 and the guide mechanisms 132 are provided only to the cooling tubes on the outermost layer. In the case of this inactivation treatment apparatus, it is possible to supply the treatment gas from a location in the vicinity of a lower part of the coal layer formed by depositing the coal inside the rotary kiln main body, thus to evenly supply the treatment gas to the entire coal layer, and to efficiently perform the inactivation treatment on the coal.

Although the inactivation treatment apparatus 100 configured to perform the inactivation treatment on the coal 4 has been described above, it is also possible to provide an inactivation treatment apparatus configured to perform an inactivation treatment on carbides such as biomass (wood and waste materials, for example) instead of the coal 4. The inactivation treatment apparatus of this configuration also achieves the operation and effect similar to those of the above-described inactivation treatment apparatus 100.

EXAMPLE

An example carried out for confirming the operation and effect of the inactivation treatment apparatus according to the present invention will be described below. It is to be noted, however, that the present invention is not limited only to the following example described on the basis of various data.

A confirmation test was conducted in terms of relations among detention time of coal (inactivation treatment time), temperature of the coal, an amount of oxygen adsorption of the coal, and an oxygen concentration in the inactivation treatment apparatus. This test employed pyrolyzed coal having a volatile matter content equal to 35%, a grain size of 1.7 mm (a mean area diameter of 0.4 mm), and a temperature at 150° C. when supplied to the apparatus. The treatment gas having an oxygen concentration equal to 10% was used therein. The apparatus used therein was configured to supply the coal and the treatment gas from the base end side, and meanwhile, to feed the treated coal (the upgraded coal), the used treatment gas, the cooling water, and the used cooling water from the distal end side. The cooling water adjusted to 30° C. was used therein. The pyrolyzed coal was subjected to detention for 58.5 minutes.

Figure 5:
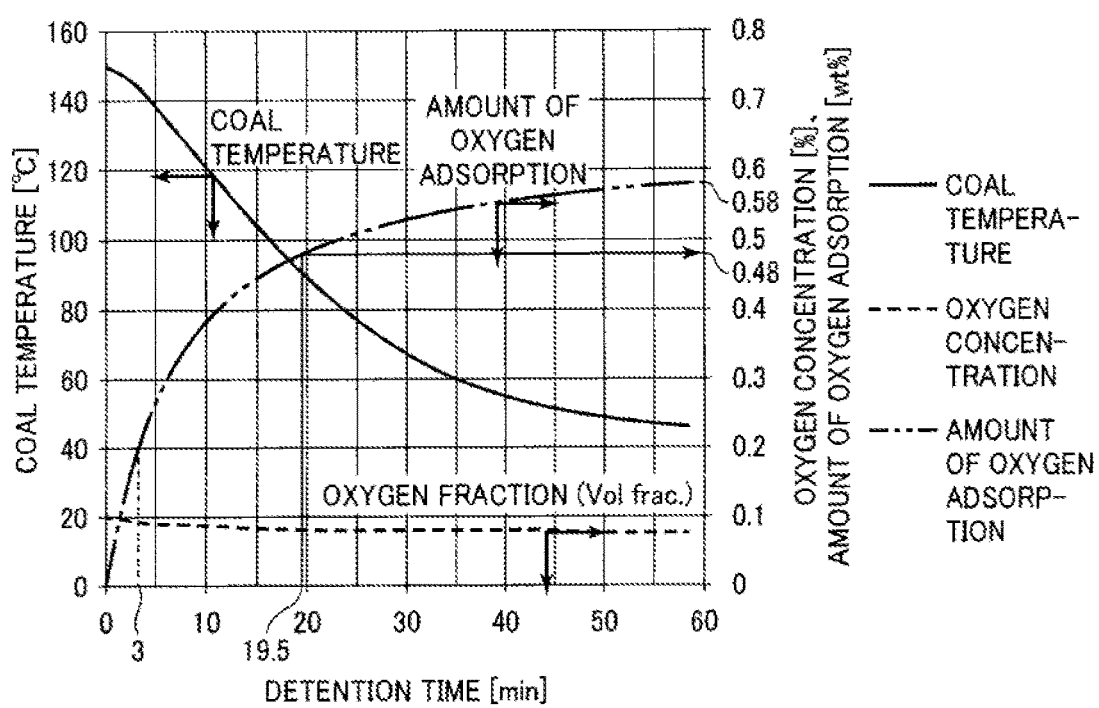
FIG. 5 is a graph showing relations between detention time of coal and temperature of coal as well as an amount of oxygen adsorption in the inactivation treatment apparatus according to the present invention.
Figure 6:
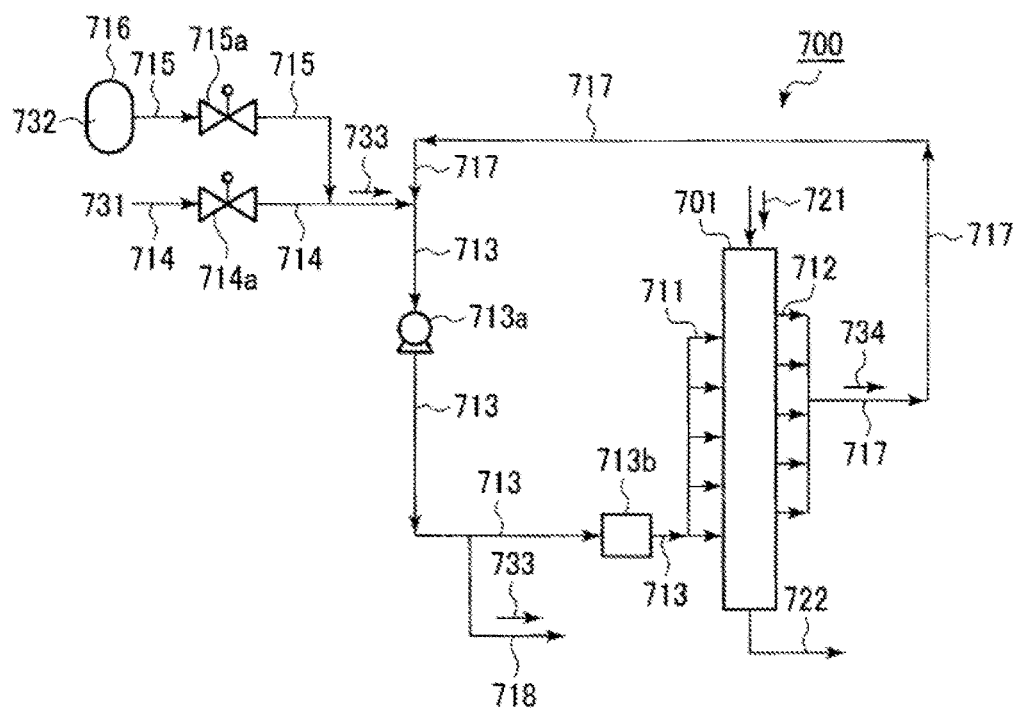
FIG. 6 is a schematic configuration diagram of a conventional coal inactivation treatment apparatus.

As a result of conducting the test under the conditions mentioned above, as shown in FIG. 5, it was confirmed that the amounts of oxygen adsorption were equal to 0.2 wt % when the pyrolyzed coal was subjected to detention in the apparatus for 3 minutes, equal to 0.48 wt % when the pyrolyzed coal was subjected to detention in the apparatus for 19.5 minutes, and equal to 0.58 wt % when the pyrolyzed coal was subjected to detention in the apparatus for 58.5 minutes, respectively. It was confirmed that the used cooling water reached 37.8° C. It was also confirmed that the temperature of the pyrolyzed coal gradually declined along with an increase in detention time.

Since 0.3 minutes of the detention time for the pyrolyzed coal corresponds to 5% of the total length of the apparatus, this case made it clear that the pyrolyzed coal successfully adsorbed about 34% of the total amount of oxygen adsorption thereof. Since 19.5 minutes of the detention time for the pyrolyzed coal corresponds to about 33% of the total length of the apparatus, this case made it clear the pyrolyzed coal successfully adsorbed about 83% of the total amount of oxygen adsorption thereof.

Hence, this confirmation test made it clear that the process response could be improved.

REFERENCE SIGNS LIST

1 low-grade coal (low-quality coal), 2 dried coal, 3 pyrolyzed coal, 4 coal, 5 coal layer, 5a surface, 6 upgraded coal, 11 air, 12 inert gas (nitrogen gas), 13 treatment gas, 14 used gas, 21 cooling water, 22 used cooling water, 100 inactivation treatment apparatus, 101 hopper, 102 screw feeder, 103 rotary kiln main body (kiln main body), 103a temperature sensor, 104 protrusion, 105 roller, 106 gear, 107 driving motor, 107a gear, 108 sealing device, 109a, 109b sealing devices, 111 base end side casing, 112 distal end side casing, 112a chute, 112b gas discharge outlet, 120 coal cooling device, 121 cooling water feed tube, 122 triple fluid feed header, 123 cooling tube (double tube), 124 bearing, 125 cooling water discharge header, 126 cooling water discharge tube, 130 treatment gas supply device, 131 treatment gas supply tubes, 131a hole (nozzle hole), 132 guide mechanisms, 133a, 133b guide plates, 134 current plate, 135 treatment gas feed tube, 135a oxygen sensor, 136 air supply tube, 136a flow rate adjustment valve, 137 blower, 138 inert gas (nitrogen gas) supply tube, 138a flow rate adjustment valve, 139 inert gas (nitrogen gas) supply source, 151 dryer, 152 pyrolyzer, 153 cooler, 201 rotary kiln main body (kiln main body), 211 cooling tube on first layer, 212 cooling tube on second layer, 213 cooling tube on third layer, 214 cooling tube on fourth layer, 215 cooling tube on fifth layer, 221 treatment gas supply tube, 221a ejection nozzle, 222 treatment gas supply tube, 222a ejection nozzle, A1 rotational direction of rotary kiln main body 103, A2 rotational direction of rotary kiln main body 201, C1 center axis of rotary kiln main body 103, C2 center axis of cooling tube 123, C3 center axis of rotary kiln main body 201, D1 distance between center axis of rotary kiln main body 103 and center axis of cooling tube 123, L1 trajectory of center axis of cooling tube 123, L11 line (auxiliary line) in a radial direction that runs through center axis of rotary kiln main body 103, L12 line (auxiliary line) that runs through gas injection part and center axis of cooling tube 123, L21 trajectory of center axis of cooling tube 211 on first layer, L22 trajectory of center axis of cooling tube 212 on second layer, L23 trajectory of center axis of cooling tube 213 on third layer, L24 trajectory of center axis of cooling tube 214 on fourth layer, L25 trajectory of center axis of cooling tube 215 on fifth layer, r1 radius of rotary kiln main body, α angle of ejection of the treatment gas.

The invention claimed is:

1. An inactivation treatment apparatus configured to inactivate a carbide by using a treatment gas containing oxygen, comprising:
   a kiln main body provided rotatably and allowing the carbide to pass inside of the kiln main body from a base end side to a distal end side;
   a cooling tube provided in such a way as to be rotatable in conjunction with the kiln main body and to extend in a longitudinal direction of the kiln main body, and causing cooling water to flow inside of the cooling tube; and
   a treatment gas supply tube provided in such a way as to be rotatable in conjunction with the kiln main body and to extend in the longitudinal direction of the kiln main body, and configured to supply the treatment gas into the kiln main body, wherein
   the cooling tube and the treatment gas supply tube are disposed in such a way as to run through a carbide layer formed by depositing the carbide inside the kiln main body when the kiln main body is rotated,
   the treatment gas supply tube is disposed adjacent to the cooling tube,
   the treatment gas supply tube includes a nozzle hole configured to supply the treatment gas into the kiln main body,
   the nozzle hole is disposed opposite to the cooling tube,
   the treatment gas supply tube includes guiding means for guiding a direction of supply of the treatment gas into the kiln main body, and
   the guiding means includes:
   two guide plates disposed adjacent to the treatment gas supply tube and fixed to the cooling tube; and
   a current plate fixed to the guide plates, so that the guiding means is configured to bring the treatment gas discharged from the nozzle hole of the treatment gas supply tube into contact with the cooling tube and then to eject the treatment gas to the carbide.

2. The inactivation treatment apparatus according to claim 1, wherein
   the guiding means is provided such that the direction of supply of the treatment gas is set in a range from 0 degrees to 90 degrees inclusive with respect to a line in a radial direction running through a center axis of the kiln main body in terms of a reverse rotational direction of the kiln main body.

3. The inactivation treatment apparatus according to claim 1, wherein
   the cooling tubes are disposed on multiple layers in a radial direction of the kiln main body, and
   the treatment gas supply tube is provided to the cooling tube disposed on the outermost layer.

4. The inactivation treatment apparatus according to claim 1, wherein
   a supply flow velocity of the treatment gas into the kiln main body is adjusted in a range from 0.05 m/sec to 3 m/sec.

5. The inactivation treatment apparatus according to claim 1, wherein
an amount of supply of the treatment gas into the kiln main body is adjusted equal to or above 0.025 (NL-$O_2$/min/kg—the carbide).

6. The inactivation treatment apparatus according to claim 1, wherein
the nozzle hole is provided on the distal end side of the kiln main body and provided in a region equal to or above 5% of a total length of the kiln main body.

7. The inactivation treatment apparatus according to claim 1, wherein
the carbide is coal.

* * * * *